(12) United States Patent
Liu et al.

(10) Patent No.: US 12,476,960 B2
(45) Date of Patent: Nov. 18, 2025

(54) END-TO-END CONTEXT ISOLATION ACROSS MICROSERVICES IN A MULTI-TENANT DISTRIBUTED CLOUD INFRASTRUCTURE

(71) Applicant: Microsoft Technology Licensing, LLC, Redmond, WA (US)

(72) Inventors: Suyin Liu, Suzhou (CN); Jie Liu, Bellevue, WA (US); Na Li, Bellevue, WA (US); Yizhong Wu, Shanghai (CN); Chuanbo Zhang, Suzhou (CN); Xiangyi Deng, Suzhou (CN); Yiteng Yu, Shanghai (CN); Yu Zhang, Suzhou (CN); Yu Xia, Suzhou (CN); Jonathan Shi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 18/208,686

(22) Filed: Jun. 12, 2023

(65) Prior Publication Data

US 2024/0414148 A1 Dec. 12, 2024

(51) Int. Cl.
*H04L 9/40* (2022.01)
(52) U.S. Cl.
CPC .................. *H04L 63/083* (2013.01)
(58) Field of Classification Search
CPC . H04L 63/083; H04L 63/0807; G06F 21/335; G06F 21/44; G06F 21/53
See application file for complete search history.

(56) References Cited

U.S. PATENT DOCUMENTS

| 9,967,319 B2 | 5/2018 | Savelieva et al. |
| 2014/0289391 A1 | 9/2014 | Balaji et al. |

(Continued)

FOREIGN PATENT DOCUMENTS

| CN | 115391828 A | 11/2022 |
| CN | 112905617 B | 1/2023 |

OTHER PUBLICATIONS

International Search Report and Written Opinion received for PCT Application No. PCT/US2024/031334, Sep. 30, 2024, 15 pages.

(Continued)

*Primary Examiner* — Chau Le
(74) *Attorney, Agent, or Firm* — Ray Quinney & Nebeker P.C.; Christopher K. Hallstrom

(57) ABSTRACT

This disclosure relates to a context enforcement system that efficiently and securely protects tenant context information that travels across microservices in a multi-tenant distributed cloud computing system and protects against data leaks that often occur in conventional microservice management systems. For example, the context enforcement system ensures secure external and internal communications and context isolation by providing various shared library functions to microservices of a multi-tenant distributed cloud computing system. Additionally, the shared library provided by the context enforcement system improves the efficiency of the multi-tenant distributed cloud computing system by allowing microservices to focus on target operations rather than also maintaining and performing additional redundant functions.

20 Claims, 8 Drawing Sheets

(56) References Cited

U.S. PATENT DOCUMENTS

| | | | | |
|---|---|---|---|---|
| 2016/0063313 | A1* | 3/2016 | Sandholm | G06F 21/32 |
| | | | | 382/118 |
| 2018/0077138 | A1* | 3/2018 | Bansal | G06Q 20/325 |
| 2020/0244638 | A1* | 7/2020 | Gupta | G06F 9/50 |
| 2022/0342718 | A1* | 10/2022 | Iqbal | G06F 9/5027 |
| 2023/0247087 | A1* | 8/2023 | Nagaraja | G06F 9/5072 |
| | | | | 709/201 |

OTHER PUBLICATIONS

"AsyncLocal<T> Class", Retrieved from: https://learn.microsoft.com/en-US/dotnet/api/system.threading.asynclocal-1?view=net-7.0, Retrieved Date: Mar. 7, 2023, 4 Pages.

* cited by examiner

END-TO-END CONTEXT ISOLATION ACROSS MICROSERVICES IN A MULTI-TENANT DISTRIBUTED CLOUD INFRASTRUCTURE

BACKGROUND

Microservices are becoming increasingly popular across various computing systems, including multi-tenant distributed cloud systems, as a way to design and deploy software applications. Microservices are a software architecture pattern in which an application is broken down into small, independent services that can be developed, tested, and deployed separately. Microservices typically perform single tasks and communicate with other microservices through application programming interfaces (APIs). In a multi-tenant cloud system, microservices can provide several benefits, such as scalability, fault tolerance, and ease of deployment. Despite recent advances in utilizing microservices, conventional microservice management systems often struggle with inefficiencies due to the complexity of providing shared resources to multiple tenants simultaneously while also trying to protect tenant data. Further, microservices are commonly maintained by separate engineering teams that are globally geo-located, which increases the difficulty in maintaining microservices and operating different microservices together.

BRIEF DESCRIPTION OF THE DRAWINGS

The detailed description provides one or more implementations with additional specificity and detail through the use of accompanying drawings, as briefly described in this disclosure. Each of the included figures may be implemented according to one or more implementations included in this disclosure.

DETAILED DESCRIPTION

Figure 1:
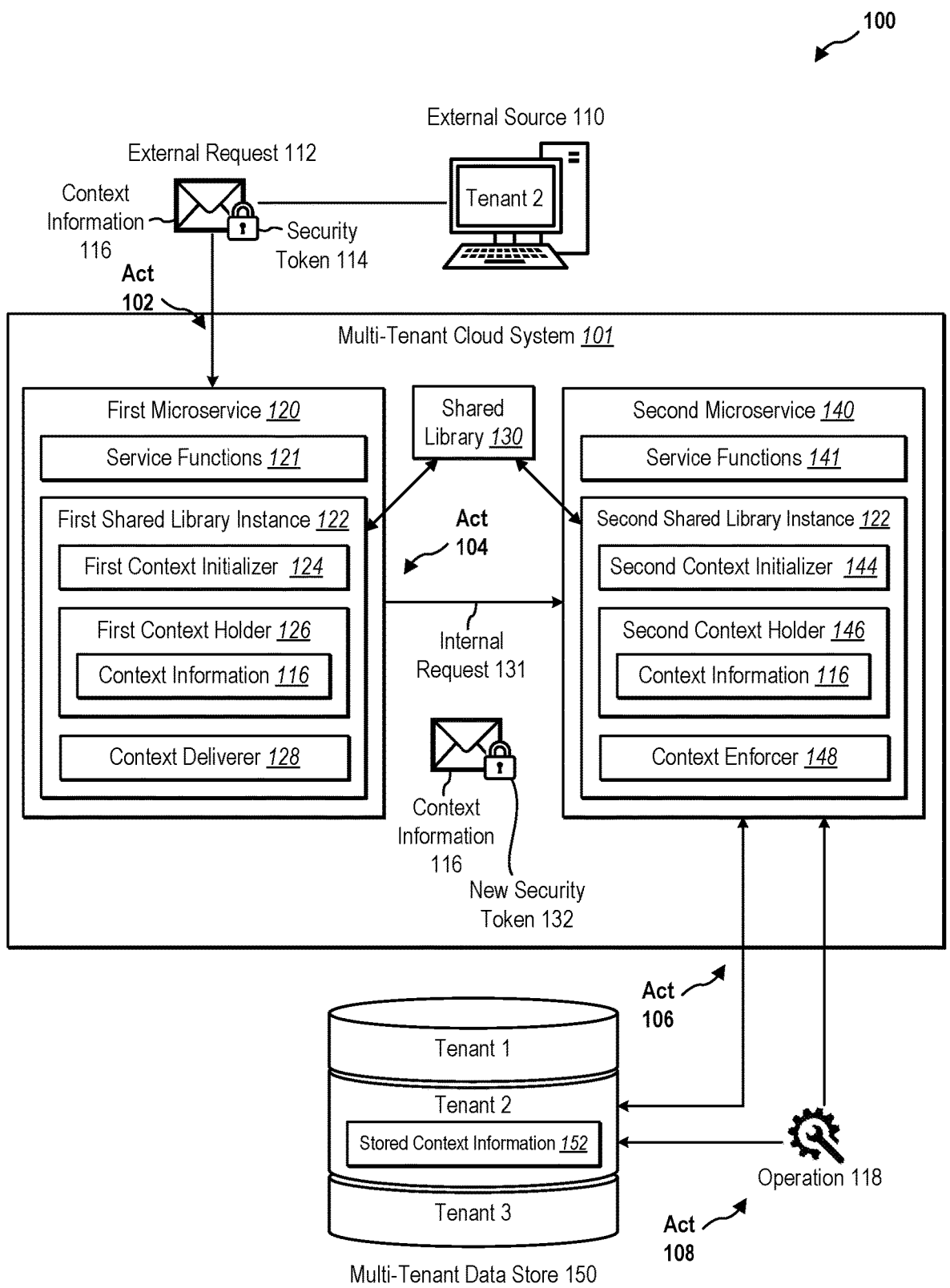
FIG. 1 illustrates an overview example of implementing a context enforcement system to provide end-to-end context isolation of tenants across microservices in a multi-tenant distributed cloud infrastructure.

The present disclosure presents a context enforcement system that efficiently and securely protects tenant context information that travels across microservices in a multi-tenant distributed cloud infrastructure or computing system (or simply "multi-tenant cloud system") and protects against data leaks that often occur in conventional microservice management systems. For example, the context enforcement system ensures secure external and internal communications and context isolation by providing various shared library functions to microservices of a multi-tenant cloud system. Additionally, the shared library provided by the context enforcement system improves the efficiency of the multi-tenant cloud system by allowing microservices to focus on target operations rather than also maintaining and performing additional redundant functions.

To elaborate, the context enforcement system provides end-to-end context isolation across microservices in a multi-tenant cloud system utilizing a shared library of microservice context functions (e.g., functions within a microservice that correspond to a specific context). For example, in response to a first microservice receiving an external request from a tenant, the context enforcement system calls a first shared library instance, which includes context functions to securely extract context information from the external request and store the context information in a first context holder. Additionally, the context enforcement system utilizes the first shared library instance to provide to a second microservice a secure internal request having the context information. In response to receiving the secure internal request, the context enforcement system utilizes a second shared library instance to store the context information in a second context holder at the second microservice.

Additionally, in various implementations, the context enforcement system enables the second microservice to utilize the second library instance to enforce the context information from the second context holder at the second microservice using stored context information stored in a multi-tenant data store. Based on the compatibility of the stored context information at the multi-tenant data store, the context enforcement system enables the second microservice to perform an operation indicated in the initial tenant request (e.g., as passed along in the context information) with the stored context information. By enforcing compatibility, the context enforcement system ensures context isolation for the tenant from other tenant data stored and processed by the multi-tenant cloud system. While the two microservices are provided as an example, the multi-tenant cloud system can include one or more additional microservices that securely pass context information from the first microservice to the second microservice.

As mentioned in this disclosure, the context enforcement system provides a shared library that includes context functions accessible to microservices of the multi-tenant cloud system. As further described in this document, examples of context functions within a shared library include a context initializer, a context holder, a context deliverer, and a context enforcer. An example of a context function includes a context initializer that receives requests, verifies the requests based on security tokens, extracts context information from the security tokens, and stores the context information in context holders. Another example includes a context holder that securely stores context information in a persistent data object and selectively provides microservices with read-only access to the context information to ensure that the context information is not intentionally or inadvertently changed. An additional example includes a context deliverer that generates and securely provides copies of context information between microservices of the multi-tenant cloud system. A further example includes a context enforcer that determines whether the context information stored in a context holder of a microservice is compatible with stored context information stored in a multi-tenant data store before permitting the microservice to perform an operation with the stored context information.

As described in this document, the context enforcement system delivers several technical benefits in terms of computing efficiency and security compared to existing systems. Moreover, the context enforcement system provides several practical applications that solve problems associated with securely providing and isolating tenant context information across a multi-tenant cloud system, resulting in several benefits as described herein.

As noted in this disclosure, multi-tenant distributed cloud infrastructures are complex and handle data and services for several tenants at the same time. As a result, efficiently and securely isolating tenant data, including context information, is a challenging task. Conventional microservice management systems primarily rely on each microservice to individually manage a tenant's context information as it moves across the multi-tenant cloud system. For example, each microservice that needs to isolate tenant data context information must tediously make application programming interface (API) calls to pass the context between microservices. By requiring each microservice to manage context information isolation services, conventional microservice management systems inefficiently add an extra workload to each microservice and take away processing resources from the microservices' designated functions.

Further, under conventional microservice management systems, in addition to their specific features and functions, each microservice must include additional functions for tenant context information isolation. For instance, while Microservice A performs Function A and Microservice B performs Function B, both Microservice A and Microservice B must also include functions to carry out tenant context information isolation, inefficiently increasing the size of each microservice with redundant services.

One of the negative consequences of the approach taken by conventional microservice management systems is that tenant data is periodically corrupted or leaked to other tenants. For example, corrupted data results in microservices being unable to successfully process incoming requests and, in some cases, results in a microservice accessing and/or changing the data of another tenant (i.e., data leakage). In addition to being bad for the entity managing the multi-tenant cloud system, data leaks cause significant inefficiencies for each microservice involved and microservice management systems in general. Additionally, data leaks are often caused by the multi-tenant cloud system being too complex, which allows for vulnerabilities to be exploited.

In contrast, the present context enforcement system provides enhanced security and improved efficiency to multi-tenant cloud systems by providing a shared library that is separately accessible to microservices across the multi-tenant cloud system. As described herein, the shared library includes various context functions that address both the efficiency and security shortcomings of conventional microservice management systems.

To illustrate, the present context enforcement system allows each microservice to access a separate instance of the shared library. In many implementations, the shared library includes a context initializer that verifies requests received by a microservice from either external or internal sources. In this way, the context enforcement system provides a unified approach for context isolation scenarios from a central location via the shared library. Also, by using a central shared library, the context enforcement system allows for improved monitoring through alerts and dashboards.

In addition, by storing and implementing context information functions using the shared library rather than individually by each microservice, the microservice does not need to store and perform additional operations. This efficiently results in smaller, less complex microservices that require less memory. As a further benefit, the context enforcement system allows each microservice to perform more important and targeted operations.

Regarding enhanced security, the context enforcement system includes various context information functions in the shared library to ensure end-to-end tenant context isolation across the multi-tenant cloud system. For example, in many cases, the shared library includes a context initializer that verifies incoming requests for a microservice. Specifically, the context initializer fully authenticates the tenant that originated the request via a security token and authorizes operations included in the request for the requesting tenant. The context initializer also securely stores context information from a verified request with the microservice.

In many instances, the shared library enables the microservice to implement a context holder specific to the microservice. In this way, each microservice can implement its own context holder that includes copies of the same context information. In many instances, the context initializer stores context information from the verified request in the context holder. In some examples, the context holder allows the microservice to have read-only access to the context information but restricts the microservice from making any changes to the context information stored in the context holder. Indeed, the context information cannot be changed by the microservice either inadvertently or intentionally (e.g., through a breach of the microservice). This, along with other security measures, prevents data leaks across the multi-tenant cloud system.

The shared library of the context enforcement system also provides a context deliverer that securely passes or transfers context information between microservices in the multi-tenant cloud system. To illustrate, the context deliverer obtains the protected context information from the context holder and securely embeds it in a new request having a new security token. In many instances, the new security token is only valid between the two microservices. In this way, each time the context information is passed between microservices, the context enforcement system ensures secure isolation of the context information.

Additionally, the shared library of the context enforcement system provides a context enforcer that compares and audits context information stored in a context holder with stored tenant data. For example, the context enforcement system utilizes the context enforcer to verify the compatibility of the context information from the context holder with the stored context information of the tenant, which is stored on a storage device. In some instances, the context enforcement system utilizes the context holder to ensure that the operation in the context information will only apply to the data belonging to the verified tenant and not the data of another tenant. Otherwise, the context enforcer rejects the operation as invalid. In this way, the context enforcement system enhances tenant security and prevents data leaks by enforcing only valid, authenticated, authorized, and compatible operations.

This disclosure uses several terms to describe the features and advantages of one or more implementations. For instance, the term "multi-tenant cloud system" refers to a framework computing architecture approach that enables multiple tenants to share a common set of computing resources while maintaining isolation and separation of data and operations. For example, a multi-tenant cloud system includes a set or group of computing devices that implement multiple services that multiple tenants can access and use simultaneously. Commonly, each tenant is isolated from the other tenants to keep each tenant's data and operations separate and secure. In some instances, a multi-tenant cloud system includes a multi-tenant distributed cloud system and/or a multi-tenant distributed cloud infrastructure.

In this document, the term "microservice" refers to a service that performs a specific task, function, or feature. Microservices are commonly smaller pieces of a larger program that, when combined with other microservices, allow the larger program to perform complex operations. A microservice can be developed, deployed, and managed independently of the other services. Additionally, microservices commonly communicate with each other using lightweight protocols such as HTTP or message queues. Additionally, for clarification, an upstream microservice refers to a microservice sending a request and a downstream microservice refers to a microservice receiving the request.

The term "shared library" refers to one or more components that provide shared services, features, and functionality to different applications, systems, or services (e.g., microservices) across a multi-tenant cloud system. For example, a shared library provides common functionality across different microservices that invoke or call different instances of the shared library at the same or different times. Often, a shared library is a software construct but may be a hardware element in some implementations.

A shared library can include various context or context information functions. For example, a shared library can include a context initializer, a context holder, a context deliverer, and/or a context enforcer. The context enforcement system allows a microservice to invoke one or more of these functions. Additional details regarding each of these context information functions are provided in this disclosure.

In this document, the term "tenant" refers to an organization or entity that uses the multi-tenant cloud system as a customer or user. In this context, a tenant requests that the multi-tenant cloud system perform one or more operations. For example, a tenant requests the provisioning of additional virtual machines through a computing device such as a tenant client device, tenant server device, or another computing device external to the multi-tenant cloud system. In many instances, a tenant is identified by a unique tenant ID. The term "tenant ID" refers to an identifier that distinguishes one tenant from another tenant. In various instances, the context enforcement system utilizes a tenant ID or other identifier to ensure that the tenant has access only to resources and data only belonging to them.

In various implementations, a tenant makes a request to the context enforcement system via a computing device. The term "request" refers to a message that seeks to access a resource provided by or via the multi-tenant cloud system. Typically, a request includes a security token, such as an HTTP security token, which is used to verify the identity of the tenant (e.g., the tenant ID) making the request and whether the tenant has permission to access the requested resource.

Additionally, a request or a security token can include a context for the tenant. In this document, the terms "context" and "context information" refer to the specific needs, preferences, devices, departments, and/or behaviors of a tenant using the multi-tenant cloud system. Context information is often a subset of the context of a tenant. In the multi-tenant cloud system setting, the context of a tenant (e.g., customer context or tenant context) allows each tenant's unique needs and preferences to be communicated to the cloud, such that the tenant may be provided with the right tools and settings to use the cloud services in the way that works best for them, while the cloud provides shared resources to multiple tenants. In some instances, context information includes data and information of a tenant to be used with a service or function provided by the multi-tenant cloud system. In some implementations, a request can also include an operation requested by the tenant.

Additionally, context information can be specific to users within a tenant. For example, User A and User B may belong to the same tenant but be associated with different context information. In these instances, User A cannot access the context information of User B even if User A requests to access information of User B. In other instances, different users of a tenant may be able to both access context information of the tenant.

The term "multi-tenant data store" refers to a storage medium or structure that maintains stored contextual information (i.e., context information) for multiple tenants of a multi-tenant cloud system. For example, a multi-tenant data store includes entries for multiple tenants, where each entry is indexed to, or associated with, a specific tenant ID. In some instances, the multi-tenant data store is another external cloud service, such as MICROSOFT® AZURE®.

Additionally, this disclosure describes a context enforcement system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the connection may be considered a transmission medium. Transmission media can include a network and/or data links that carry required program code means in the form of computer-executable instructions or data structures, which can be accessed by a general-purpose or special-purpose computer.

Additional details regarding an example implementation of the context enforcement system are discussed in connection with the following figures. For example, FIG. 1 illustrates an example overview of implementing a context enforcement system to provide end-to-end context isolation of tenants across microservices in a multi-tenant distributed cloud infrastructure according to one or more implementations.

As shown, FIG. 1 includes a system environment 100 having various components along with a series of acts that provides an example of the context enforcement system providing end-to-end context isolation based on a tenant making a request. In particular, FIG. 1 includes a multi-tenant cloud system 101, an external source 110, and a multi-tenant data store 150, which may be part of a multi-tenant data device.

As also shown, the multi-tenant cloud system 101 includes a first microservice 120, a shared library 130, and a second microservice 140. As illustrated, the first microservice 120 includes service functions 121 particular to the first microservice 120 and a first shared library instance 122. The first shared library instance 122 includes a first context initializer 124, a first context holder 126, and a context deliverer 128 (i.e., a first context deliverer). The second microservice 140 includes service functions 141 particular to the second microservice 140 and a second shared library instance 142. The second shared library instance 142 includes a second context initializer 144, a second context holder 146, and a context enforcer 148 (i.e., a second context enforcer).

As noted in this disclosure, FIG. 1 includes a series of acts of providing end-to-end context isolation based on a tenant making a request. While FIG. 1 and the series of acts provide a high-level example of securely moving and implementing context information within a multi-tenant cloud system 101, additional details for each act in the series of acts are further provided in connection with FIG. 3.

As shown, the series of acts includes an act 102 of receiving, at a first microservice, an external request 112 with a security token 114 having context information 116. For example, an administrator for a tenant (e.g., "Tenant 2") utilizes the external source 110 to generate and provide the external request 112 to the multi-tenant cloud system 101. In various implementations, the context enforcement system enables the external source 110 to generate and provide requests. In addition, the context enforcement system provides context functions to the first microservice 120 (e.g., via the first shared library instance) that enable it to receive incoming requests from external sources for the multi-tenant cloud system 101.

As mentioned in this disclosure, the external request 112 includes the security token 114 having context information 116 for the tenant. For example, the context information includes new tenant data along with an operation or instructions to store the new tenant data. Notably, the context information 116 is protected within the security token 114 and is passed securely to the multi-tenant cloud system 101.

As shown, the series of acts includes an act 104 of utilizing a first shared library instance 122 of the first microservice 120 to securely store, process, and pass the context information to the second microservice 140 via an internal request 131 having a new security token 132 with the context information 116. For example, upon the first microservice 120 receiving the external request 112, it accesses a shared library 130 of the context enforcement system to spawn the first shared library instance 122, which includes the first context initializer 124 for verifying the security token 114, extracting the context information 116 and storing the context information 116 with the first context holder 126. Additional details regarding verifying security tokens having context information are provided in connection with FIG. 3 and FIG. 4. Further, while the two microservices are provided as an example, the multi-tenant cloud system can include additional microservices that securely pass the context information 116 from the first microservice 120 to the second microservice 140 in the manner described in this disclosure.

Additionally, the first microservice 120 may perform one or more functions using the service functions 121. For instance, the service functions 121 are allowed read-only access to the context information 116 from the first context holder 126 and determine that the context information 116 needs to be sent to the second microservice 140. Accordingly, the context deliverer 128 generates the internal request 131 that includes the new security token 132 and the context information 116 and passes it to the second microservice 140.

As shown, the series of acts includes an act 106 of utilizing the second shared library instance 142 at the second microservice 140 to receive, store, and enforce the context information with stored tenant data on a multi-tenant data store. Similar to the first microservice 120, the second microservice 140 accesses the shared library of the context enforcement system and spawns the second shared library instance 142, which can include some or all of the same functions (but different instances at the second microservice 140). For example, the second context initializer 144 verifies and extracts the context information 116 from the new security token 132 and stores it in the second context holder 146. Other functions of the second microservice 140 are allowed read-only access to the context information 116 from the second context initializer 144.

In addition, the service functions 141 may determine from the context information 116 one or more operations to be performed using stored context information 152 in the multi-tenant data store 150. Before performing an operation, the context enforcement system utilizes the context enforcer 148 to ensure that the stored context information 152 belongs to the tenant (i.e., Tenant 2) and not another tenant (i.e., Tenant 1 or Tenant 3). As further detailed in connection with FIG. 3 and FIG. 5, the context enforcer ensures that any operations performed with the context information 116 from the second context holder 146 are compatible with the stored context information 152 in the multi-tenant data store 150.

As shown, the series of acts includes an act 108 of performing an operation 118 between the context information 116 in the second context holder 146 and the stored context information 152 (e.g., stored tenant data) in the multi-tenant data store 150. For example, based on the context enforcer 148 showing context compatibility and that tenant security measures are in place, the context enforcement system allows the second microservice 140 to use the service functions 141 to perform one or more operations with the stored context information 152 associated with the context information 116.

As shown in FIG. 1, the context enforcement system provides security to the context information of a tenant in requests being passed into, thru, and out of the multi-tenant cloud system 101. Furthermore, the context enforcement system ensures that context information within each microservice is protected from intentional or inadvertent changes. As a result, the context enforcement system processes requests more efficiently while also preventing leaks of tenant information to improve privacy protection.

Figure 2:
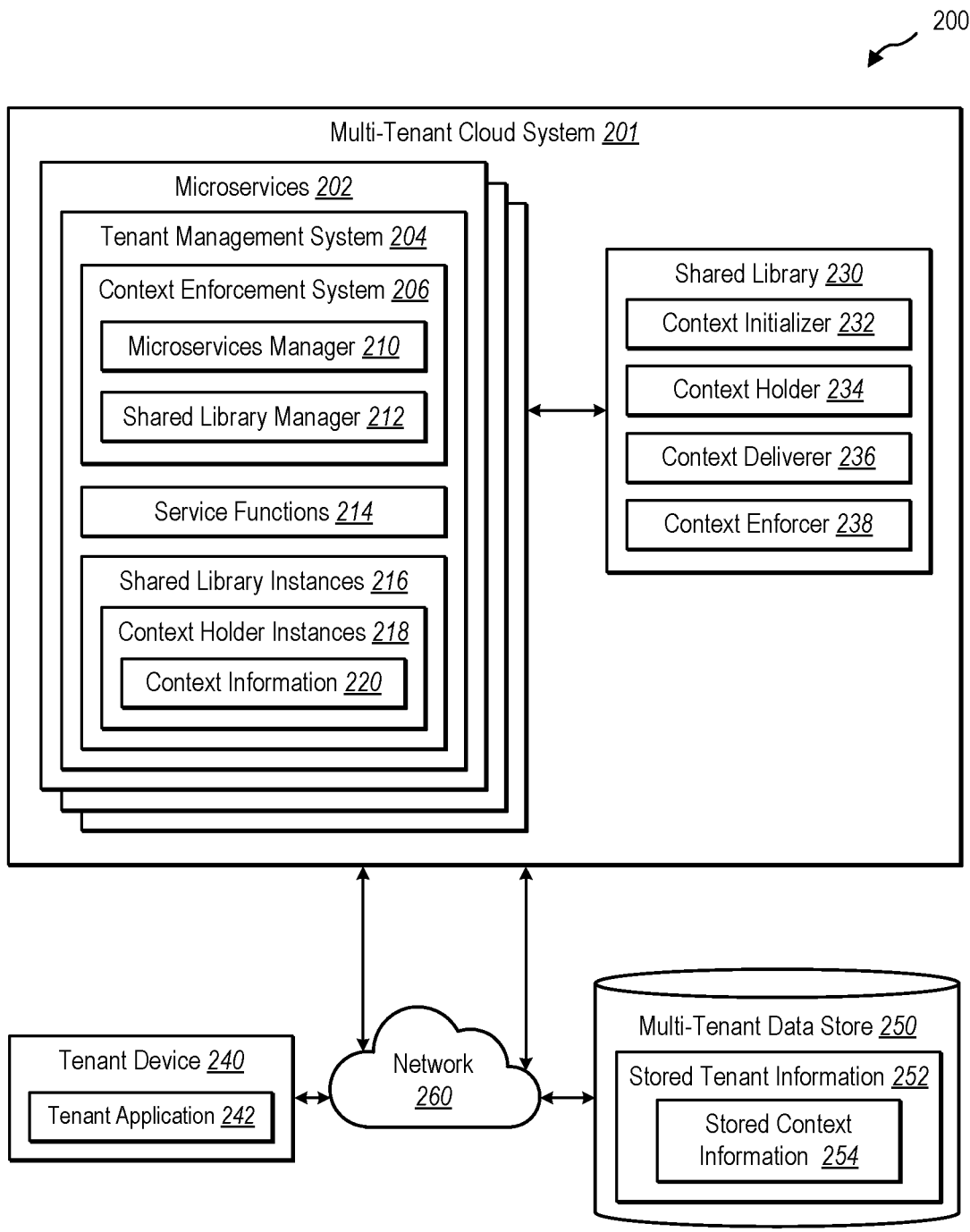
FIG. 2 illustrates an example system environment where a context enforcement system is implemented.

With a general overview of the context enforcement system in place, additional details are provided regarding the components and elements of the context enforcement system. To illustrate, FIG. 2 illustrates an example system environment where a context enforcement system is implemented according to one or more implementations. While FIG. 2 shows an example arrangement and configuration with respect to the context enforcement system, other arrangements and configurations are possible.

As shown, FIG. 2 includes a computing environment 200 of a computing system having a multi-tenant cloud system 201 (or simply a multi-tenant cloud system 201), a tenant device 240, and a multi-tenant data store 250, which are connected by a network 260. In some implementations, the multi-tenant cloud system 201 is an example of the multi-tenant cloud system 101. Further details regarding these and other computing devices are provided in connection with FIG. 8. In addition, FIG. 8 also provides additional details regarding networks, such as the network 260 shown.

As shown, the multi-tenant cloud system 201 includes microservices 202 that each perform targeted functions and combine to perform orchestrated tasks. As shown, the microservices 202 include a tenant management system 204 for managing tenant operations. For instance, the tenant management system 204 generally allows the multi-tenant cloud system 201 to securely share resources among different tenants at the same time.

As also shown, the tenant management system 204 of the microservices 202 includes the context enforcement system 206, service functions 214, and shared library instances 216. In some implementations, the context enforcement system 206 is located outside of the tenant management system 204 or outside of the microservices 202 on the multi-tenant cloud system 201. In various implementations, portions of the context enforcement system 206 are located across different components of the multi-tenant cloud system 201. For instance, portions of the context enforcement system 206 are embedded into various functions and services throughout the multi-tenant cloud system 201, which causes the various functions to provide end-to-end isolation of tenant contexts.

As shown, the context enforcement system 206 in FIG. 2 includes a microservice manager 210 for managing the various microservice functions and features (e.g., the service functions 214). The context enforcement system 206 also includes a shared library manager 212 for managing the shared library 230 and enabling the microservices 202 to invoke or call separate instances of the shared library 230 and/or its context components and functions. By the context enforcement system 206 providing access to the shared library 230, each of the microservices 202 is able to invoke or call instances of the shared library 230 to perform corresponding context components rather than having to individually perform these services. In this way, the microservices 202 focus on targeted functions rather than each having to perform redundant services.

The shared library instances 216 shown can include one or more of the components included in the shared library 230. As shown in the microservices 202, the shared library instances 216 include context holder instances 218 having context information 220. For example, a set of multiple microservices each include a separate shared library instance, and each shared library instance includes a context holder (i.e., a context holder instance). As the context information 220 is securely passed between the microservices, each microservice individually stores the context information 220 in its context holder and retrieves it when needed. This allows the context information to be securely shared between different microservices while also being protected within each microservice.

As shown, the multi-tenant cloud system 201 includes the shared library 230, which includes various context components. For example, the shared library 230 includes a context initializer 232. In various implementations, the context initializer 232 receives requests from sources, verifies the requests based on security tokens in the requests, extracts context information from the security tokens, and/or stores the context information in context holders. In some instances, the context initializer 232 identifies a tenant ID of the tenant providing the request.

The shared library 230 also includes a context holder 234. In various implementations, the context holder 234 stores the context information in a persistent data object and provides microservices 202 with read-only access to the context information when access is requested. In this manner, the context holder 234 does not allow stored context information to be modified and ensures that the same context information is securely passed between the microservices 202.

The shared library 230 also includes a context deliverer 236. In various implementations, the context deliverer 236 generates new requests by generating new security tokens that embed the context information obtained from the context holders and securely provides the new requests to additional microservices within the multi-tenant cloud system 201.

Additionally, the shared library 230 includes a context enforcer 238. In various implementations, the context enforcer 238 determines whether the context information synchronized in the various context holder instances is compatible with stored context information 254 of stored tenant information 252 stored in the multi-tenant data store 250 before permitting operations with the stored context information 254. In some instances, the context enforcer 238 identifies the stored context information 254 in the multi-tenant data store 250 based on the context information.

In some implementations, the microservices 202 implement shared library instances. For example, a first microservice implements a first shared library instance and a second microservice implements a second shared library instance. In these implementations, the first shared library instance stores the context information in a first context holder instance that is separate from a second context holder instance of the second shared library instance.

As shown, the computing environment 200 includes the tenant device 240. In various implementations, the tenant device 240 is one or more computing devices associated with a tenant. As shown, the tenant device 240 includes a tenant application 242 provided by the context enforcement system 206 that allows the tenant device 240 to directly or indirectly access the multi-tenant cloud system 201. For instance, the tenant application 242 is a browser or an application through which the context enforcement system 206 provides a user interface to the multi-tenant cloud system 201. For example, an administrator of the tenant utilizes the tenant device 240 to provide tenant-based requests to the multi-tenant cloud system 201, as described in this disclosure.

In addition, the computing environment 200 features a multi-tenant data store 250, which contains stored tenant information 252 related to multiple tenants. This stored tenant information 252 includes stored context information 254 for each tenant, which may comprise data entries, preferences, configuration settings, status levels, relationships, or other context information. For example, each piece of stored context information 254 includes a tenant ID, user ID, partner ID, scope ID, or another attribute that the context enforcer 238 can use to verify compatibility with the context information securely received in a request from the tenant device 240.

Figure 3:
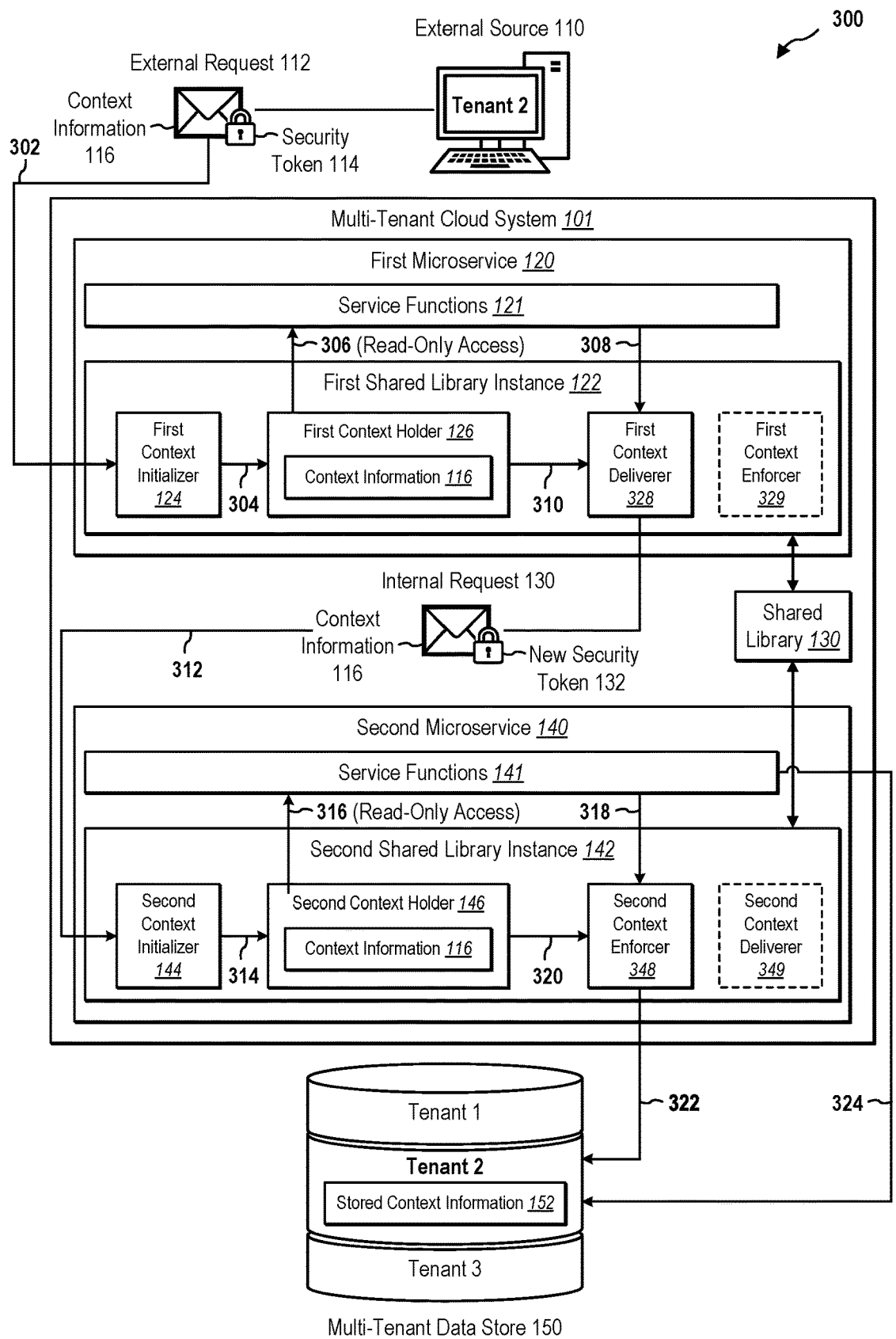
FIG. 3 illustrates an example diagram of securely providing context information across microservices in a multi-tenant distributed cloud infrastructure as well as between external computing devices and the multi-tenant distributed cloud infrastructure.

With the foundation of the context enforcement system 206 in place, additional details regarding various functions of the context enforcement system 206 will now be described. As noted in this disclosure, FIG. 3 provides additional details regarding the series of acts described in FIG. 1 as well as the components included in FIG. 2. In particular, FIG. 3 illustrates an example diagram having a series of acts for securely providing context information across microservices in a multi-tenant distributed cloud infrastructure as well as between external computing devices and the multi-tenant distributed cloud infrastructure according to one or more implementations.

As shown, FIG. 3 includes a system environment 300, which includes many of the components and elements introduced in FIG. 1. For example, the system environment 300 includes the multi-tenant cloud system 101, having the first microservice 120 and the second microservice 140, the external source 110, and the multi-tenant data store 150 having the stored context information 152. In various implementations, these components securely communicate via one or more public or private networks, which are not shown.

The first microservice 120 includes the service functions 121 and the first shared library instance 122 mentioned in this disclosure. The first shared library instance 122 includes context components invoked or called by the first microservice 120 from a shared library provided by the context enforcement system 206. For example, the first shared library instance 122 includes the first context initializer 124, the first context holder 126 mentioned in this disclosure, as well as a first context deliverer 328 (e.g., an instance of the context deliverer 128). In some cases, the first shared library instance 122 includes a first context enforcer 329 while in other cases a context enforcer is not invoked or called by the first microservice 120. Microservices can connect to each other to form a chain of connected microservices that include an external microservice and one or more internal microservices. Commonly, each of the microservices in a chain of internal microservices will utilize a context deliverer that sends/forwards context information to the next microservice in the chain, while the last microservice in the chain utilizes a context enforcer.

The second microservice 140 includes the service functions 141 and the second shared library instance 142, which can include similar but separate instances of context components from the same shared library provided by the context enforcement system 206. For example, the second shared library instance 142 includes the second context initializer 144, and the second context holder 146 mentioned in this disclosure, as well as a second context enforcer 348 (e.g., an instance of the context enforcer 148). In some cases, the second microservice 140 invokes or calls a second context deliverer 349 if context information needs to be passed to another microservice within the multi-tenant cloud system 101.

As shown in FIG. 3, the series of acts 300 includes an act 302 of the external source 110 associated with a tenant (e.g., Tenant 2) providing an external request 112 to the multi-tenant cloud system 101, which provides resources and services, including data storage and access, for multiple tenants. For example, the external request 112 may comprise performing a storage operation with respect to provided tenant data. The operation request, tenant data, and other information such as a tenant ID may comprise context information included in the external request 112. In some implementations, the first shared library instance 122 is an HTTP request that includes an HTTP authentication token.

Additionally, when generating the request, the external source 110 securely packages the context information 116 into a security token 114 to protect the request in various implementations. In this way, the external request 112 and its contents are secure as it travels to the multi-tenant cloud system 101. Additionally, the security token 114 allows the context enforcement system to perform additional verification steps at the multi-tenant cloud system 101, as discussed next.

As shown with the act 302, the external request 112 is intercepted by the first microservice 120 at the multi-tenant cloud system 101. For example, the service functions 121 in the first microservice 120 are configured to intake tenant requests, which can include directing requests to additional microservices as appropriate.

In various implementations, upon receiving the external request 112, the first microservice 120 invokes or calls the shared library 130 provided by the context enforcement system 206 (or utilizes a previously invoked or called instance) to create and utilize various context components. Accordingly, as shown, the first microservice 120 includes the first shared library instance 122, which includes the first context initializer 124.

The first microservice 120 utilizes the first context initializer 124 to verify the security token 114 and extract the context information 116 at the first microservice 120, as shown in act 304. To elaborate, in various implementations, the first context initializer 124 verifies the security token 114 by first authenticating the security token 114 to ensure the tenant ID and external source 110 are authentic and allowed.

The first context initializer 124 also extracts the context information 116 from the external request 112 and/or the security token 114 to perform authorization of the external request 112. For example, as part of verifying the external request 112, the first context initializer 124 confirms that the tenant ID associated with the external request 112 is authorized to access the resources and/or operations included in the external request 112. Additional details regarding verifying security tokens are provided in connection with FIG. 4.

Additionally, in various instances, the first context initializer 124 stores the context information 116 extracted from the external request 112. For example, the first context initializer 124 stores the context information 116 and/or the tenant ID in the first context holder 126 as shown. In various implementations, the first context initializer 124 has write permission to work with the first context holder 126 to set the tenant ID and/or write the context information 116 to the first context holder 126 while other components of the first microservice 120 have read-only access.

In various implementations, the first context holder 126 stores the context information 116 by assigning it to a persistent data object. For example, the first context holder 126 sets properties and/or values of the context information 116 to a persistent data object that stores the context information 116 for the life of the first context holder 126, the first microservice 120, and/or for a set duration. For instance, the persistent data object is a runtime object that is created and used during the execution of the first context holder 126.

In various implementations, the first context holder 126 utilizes a persistent data object that follows a programming class, such as an AsyncLocal static instance (e.g., a C# or Java programming language class), which allows for sharing data between threads (e.g., components of the first microservice 120). For example, the persistent data object stores various attributes and characteristics of the context information 116 within the first context holder 126. Additionally, in these instances, the persistent data object provides programming features for storing and retrieving data associated with specific asynchronous execution flows allowing microservices to perform the same tasks independently of one another.

As shown, the series of acts 300 includes an act 306 of the first context holder 126 providing the context information 116 to the service functions 121 of the first microservice 120. The first context holder 126 allows the service functions 121 to access the context information 116 as needed to perform operations including determining to send the context information 116 to a downstream microservice within the multi-tenant cloud system 101.

As mentioned in this disclosure, the first context holder 126 provides read-only access to the service functions 121 and many other components of the first microservice 120. In this way, the context enforcement system prevents the operations of the service functions 121 from modifying or removing values of the context information 116 being stored on the first microservice 120. For example, if the first microservice 120 was hacked, the hacker could not maliciously change the tenant ID within the first context holder 126 to another tenant, which could result in later revealing another tenant's information.

In various instances, the service functions 121 determines to send the context information 116 to a downstream microservice for further processing to fulfill the tenant's request in the external request 112. Accordingly, as shown, the series of acts 300 includes an act 308 of utilizing the first context deliverer 328 to securely propagate the context information 116 to a downstream microservice (e.g., the second microservice 140) in an internal message.

In various implementations, upon receiving a call from the first microservice 120 to send the context information 116 to the second microservice 140, the first context deliverer 328 obtains a copy of the context information 116. As shown in act 310, the first context deliverer 328 requests and receives a copy of the context information 116 from the first context holder 126. In various instances, the first context holder 126 provides the first context deliverer 328 read-only access to the context information 116.

Further, the first context deliverer 328 generates and sends an internal request 131 to the second microservice 140, as shown in the act 312. In particular, after obtaining the context information 116, which is a matching copy of context extracted from the external request 112, the first context deliverer 328 generates a new security token 132 that embeds the context information 116. By utilizing new security tokens, the first context deliverer 328 protects the requests against being changed or corrupted as it is passed within the multi-tenant cloud system 101, which is part of the end-to-end provided by the context enforcement system. In some instances, the new security token 132 is another HTTP authentication token that is different from the security token 114 from the external request 112.

Additionally, the first context deliverer 328 packages the new security token 132 into the internal request 131 and sends the internal request 131 to the second microservice 140 downstream as an internal request. In some implementations, the first microservice 120 utilizes the first context deliverer 328 to generate separate requests when sending the context information 116 to multiple downstream microservices within the multi-tenant cloud system 101. In some implementations, the first context deliverer 328 securely sends a request to a remote service or device outside of the multi-tenant cloud system 101 (or to a non-microservice within the multi-tenant cloud system 101).

As shown by act 314 of the series of acts 300, the second microservice 140 receives the internal request 131 and utilizes the second context initializer 144 to verify the new security token 132 as well as extract the context information 116 at the second microservice 140. For example, the second context initializer 144 authenticates the new security token 132 with the first microservice 120 utilizing an authentication framework, as described in this disclosure. Notably, the second context initializer 144 at the second microservice 140 may perform the same functions as the first context initializer 124 at the first microservice 120. Indeed, the second context initializer 144 is a separate instance of the first context initializer 124 called from the same shared library implemented by the context enforcement system.

Upon verifying the new security token 132 and extracting the context information 116 from the internal request 131, the second context initializer 144 works with the second context holder 146 to store the context information 116 at the second microservice 140, as is described in this disclosure.

In this manner, the first context holder 126 and the second context holder 146 store the same context for the tenant in a synchronized manner across microservices while also providing security measures by allowing each microservices to maintain its own copy of the context information 116 of the tenant.

As shown in the act 316, the second context holder 146 provides the service functions 141 with read-only access to the context information 116. Thus, regardless of what type of microservice is accessing the context information 116, the context enforcement system safeguards again modifications while passing through the multi-tenant cloud system 101.

For a downstream microservice, such as the second microservice 140, the microservice may determine to pass the context information 116 to a further downstream microservice using the second context deliverer 349, which is described in this disclosure. Additionally, or in the alternative, the second microservice 140 determines to perform an operation to fulfill the tenant request, as described next.

To illustrate, in some instances, the service functions 141 determines to perform an operation associated with the context information 116. For example, the operation includes creating, updating, or deleting (referred to as CRUD operations) tenant data based on the context information 116. In many instances, the operation requires access to tenant data stored at an external resource, such as the multi-tenant data store 150. However, the multi-tenant data store 150 includes data stored by multiple tenants. Accordingly, before performing the operation, the service functions 141 utilize the second context enforcer 348 to enforce context isolation of the tenant.

In various implementations, upon receiving a request from the second microservice 140 to perform context enforcement, as shown in the act 318, the second context enforcer 348 obtains the context information 116 from the second context holder 146, as shown in act 320. The second context enforcer 348 analyzes the context information 116 to identify a tenant ID and/or which pieces of stored context information 152 to access for performing the operations included in the tenant request. Based on the context information 116, the second context enforcer 348 identifies the stored context information 152 in the multi-tenant data store 150.

As shown in the act 322, the second context enforcer 348 enforces the stored context information 152. In one or more implementations, the second context enforcer 348 compares the stored context information 152 to determine compatibility with the context information 116. For example, the second context enforcer 348 determines whether the stored context information 152 is associated with the tenant ID.

If the stored context information is compatible, the second context enforcer 348 allows the second microservice 140 to perform the requested operation with the stored context information 152, as shown in the act 324. Otherwise, the second context enforcer 348 rejects the operation and prevents the stored context information 152 from being modified. Additional details regarding enforcing tenant data isolation data are provided in connection with FIG. 5.

Figure 4:
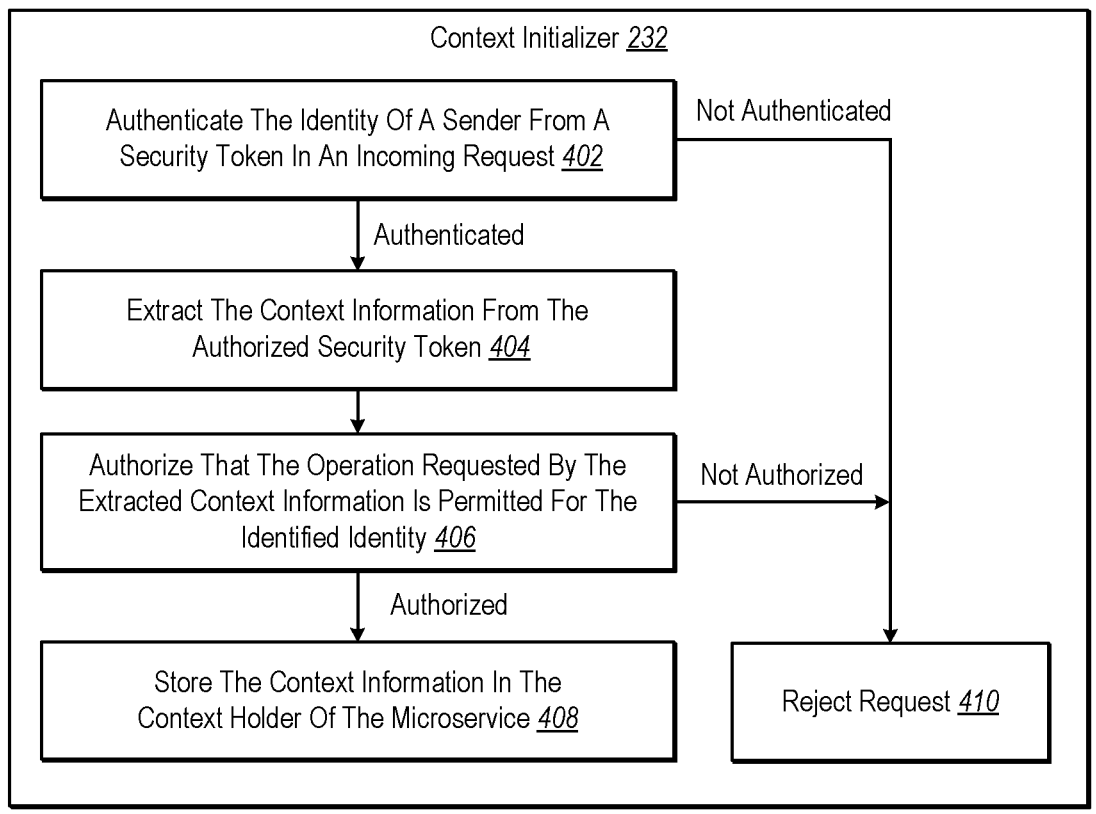
FIG. 4 illustrates an example process for verifying requests with security tokens and context information at a microservice utilizing a shared library.

As mentioned in this disclosure, FIG. 4 relates to verifying security tokens. In particular, FIG. 4 illustrates an example process for verifying requests having security tokens and context information at a microservice utilizing a shared library according to one or more implementations. As shown, FIG. 4 expands on acts performed by a context initializer 232 of a shared library instance. The context initializer 232 may represent instances of context initializers described in this disclosure (e.g., the first context initializer 124 and the second context initializer 144).

Actions of the context initializer 232 include verifying security tokens within requests, as described in this disclosure. In various implementations, verifying security tokens includes both authentication and authorization actions. As noted in this disclosure, authentication includes the identity of a tenant, user, customer, or entity while authorization includes determining what actions or operations a tenant is allowed to perform once their identity has been verified (verifying resource permission for the tenant). These concepts are further described next.

To elaborate, as shown in FIG. 4, act 402 of the context initializer 232 includes authenticating the identity of a sender (e.g., tenant ID, user ID, partner ID, scope ID) from a security token in an incoming request (e.g., an external or internal request having a security token). In various implementations, authenticating a security token includes utilizing an authentication framework that provides a challenge to the sender device (e.g., an external source) and using various authentication schemes to allow the sender device to prove authenticity. The authentication framework performed by the context initializer 232 is more than merely looking up a tenant ID on a list to grant access to the multi-tenant cloud system.

If the identity of the request is authenticated, the context initializer 232 extracts the context information from the authorized security token, as shown in the act 404. In some instances, the context initializer 232 extracts the context information (or a portion) before authenticating and uses some or all of the extracted context information to perform the authentication. For example, the context initializer 232 extracts the tenant ID from the security token. If the identity of the request is not authenticated, the context initializer 232 rejects the request, as shown in the act 410.

Because of the authentication framework, an upstream microservice cannot merely pass an external request to a downstream microservice. Instead, each time the context information 116 is passed between microservices within the multi-tenant cloud system 101, it must be securely packaged with a new security token specific to the two involved microservices. Similarly, an internal or downstream microservice cannot receive an external request as the internal or downstream microservice will fail to authenticate the external source 110 for not being another microservice within the multi-tenant cloud system 101 authorized to send the internal or downstream microservice requests.

As shown in FIG. 4, after successful authentication and extraction, the context initializer 232 includes the act 406 of authorizing that the operation requested by the extracted context information is permitted for the identified identity. In various implementations, the context initializer 232 authorizes the security token by determining that the tenant ID is allowed to perform operations included in the tenant request.

If the tenant request is authorized, the context initializer 232 stores the context information in the context holder of the microservice, as shown in the act 408. Otherwise, the context initializer 232 rejects the request, as shown in the act 410.

In some implementations, the context initializer 232 utilizes a public-facing service to authenticate and/or authorized a security token in an incoming request. In various implementations, the request is an HTTP message and the security token is an HTTP authentication token, which may be included in the header of the HTTP request message. In some instances, the context initializer 232 may perform an AuthN process for authentication and an AuthZ process for authorization. In one or more implementations, the security token follows another lightweight protocol and/or uses message queues.

Figure 5:
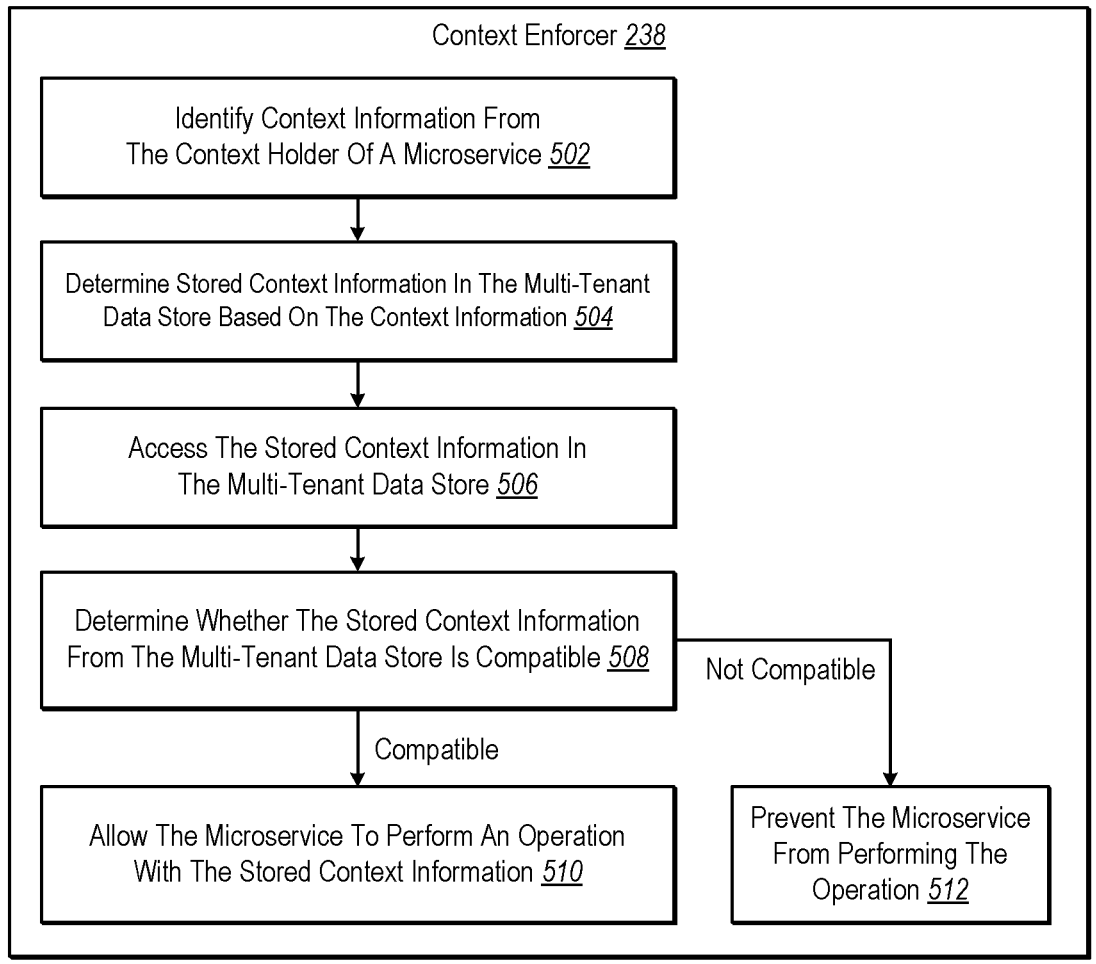
FIG. 5 illustrates an example process for enforcing context information at a microservice utilizing a shared library.

As mentioned in this disclosure, FIG. 5 relates to the context enforcement system enforcing tenant data isolation across the multi-tenant cloud system 101. In particular, FIG. 5 illustrates an example process for enforcing context information at a microservice utilizing a shared library according to one or more implementations. As shown, FIG. 5 expands on acts performed by a context enforcer 238 of a shared library instance. The context enforcer 238 may represent instances of context enforcers described in this disclosure (e.g., the second context enforcer 348).

Actions of the context enforcer 238 include enforcing the context isolation of tenants utilizing the multi-tenant cloud system 101 before allowing the microservice to perform one or more operations (e.g., CRUD operations) with the context information and/or stored context information in a multi-tenant data store. In this way, the context enforcement system ensures that data leaks do not occur and that the context of one tenant does not affect the data of another tenant also using the multi-tenant cloud system 101.

To illustrate, FIG. 5 shows the act 502 of the context enforcer 238 identifying context information from the context holder of a microservice. For example, upon receiving a request from the microservice to perform an operation and/or perform context enforcement, the context enforcer 238 invoked or called by a microservice obtains the context information from the context holder at the microservice. In various implementations, the context enforcer 238 is provided read-only access to the context holder to obtain some or all of the context information.

Additionally, the context enforcer 238 includes an act 504 of determining stored context information in the multi-tenant data store based on the context information. For example, the context enforcer 238 analyzes the context information 116 to identify an identifier (e.g., a tenant ID) and uses it to identify some or all of the stored context information belonging to the tenant in the multi-tenant data store. For example, the context enforcer 238 determines compatibility by comparing an identifier of the context information from the context holder to a stored identifier of the stored context information to determine a match.

In some implementations, the context enforcer 238 uses a piece of information in the context information 116 to identify specific data entries of stored context information in the multi-tenant data store. Upon determining the stored context information 152, the context enforcer 238 accesses the stored context information in the multi-tenant data store, as shown in act 506.

As shown in the act 508, the context enforcer 238 determines whether the stored context information from the multi-tenant data store is compatible. In some implementations, the context enforcer 238 determines compatibility by comparing the context information from the context holder of the microservice with the stored context information. To illustrate, the context enforcer 238 may use one or more of the following examples to determine compatibility.

As one example, the context enforcer 238 determines compatibility by verifying that the stored context information is associated with the tenant ID of the context information from the context holder of the microservice. If there is a match, the stored context information in the multi-tenant data store is compatible. If the stored context information includes a tenant ID of another tenant, the context enforcer 238 determines that the stored context information is not compatible.

As another example, the context enforcer 238 determines compatibility by comparing data types of the stored context information to an operation included in the context information to ensure the microservice can successfully perform the operation included in the tenant request. For example, the context enforcer 238 determines compatibility by comparing a portion of the context information from the context holder to a data type from the stored context information to determine that the portion of the context information is compatible with the data type. If there is a match, the stored context information in the multi-tenant data store is compatible. If the operation requested the context information stored at the microservice cannot be completed with the stored context information in the multi-tenant data store, then the stored context information is not compatible.

As an additional example, the context enforcer 238 determines compatibility by comparing variables and/or attributes of the context information on the microservice with the stored context information on the multi-tenant data store. For instance, the context enforcer 238 determines compatibility by matching a target value of the context information from the context holder to a corresponding target value of the stored context information. In another instance, the context enforcer 238 determines that a user ID (or partner ID, scope ID, or another ID) in the context information is included in an authorized list of users within the stored context information. In another instance, the context enforcer 238 allows the operation if the stored context information includes a predetermined number of attributes or attributes having values meeting a predetermined threshold.

If the stored context information on the multi-tenant data store is determined to be compatible, the context enforcer 238 allows the microservice to perform an operation with the stored context information, as shown in act 510. In these implementations, the context enforcement system ensures context isolation from the first receipt of the tenant request, while passing the context information through the multi-tenant cloud system, and when performing the operation with stored tenant data, which efficiently prevents data leaks from occurring. Otherwise, if the stored context information is not compatible, the context enforcer 238 rejects the request and prevents the microservice from performing the operation, as shown in act 512. In some instances, if the stored context information is not compatible, rather than reject the request, the context enforcer 238 removes (e.g., silently removes post-validation) the data determined to not be allowed to access the multi-tenant data store based on context information comparison.

In a few cases, the stored context information does not include data needed to perform the compatibility comparison. For example, the stored context information does not include a tenant ID. In some of these cases, the context enforcer 238 may reject the request the tenant request (e.g., the act 512) or prompt the tenant via the source device for authorization to proceed. In other of these cases, the context enforcer 238 proceeds with the operation depending on the operation type (e.g., add new entries to the multi-tenant data store).

Figure 6:
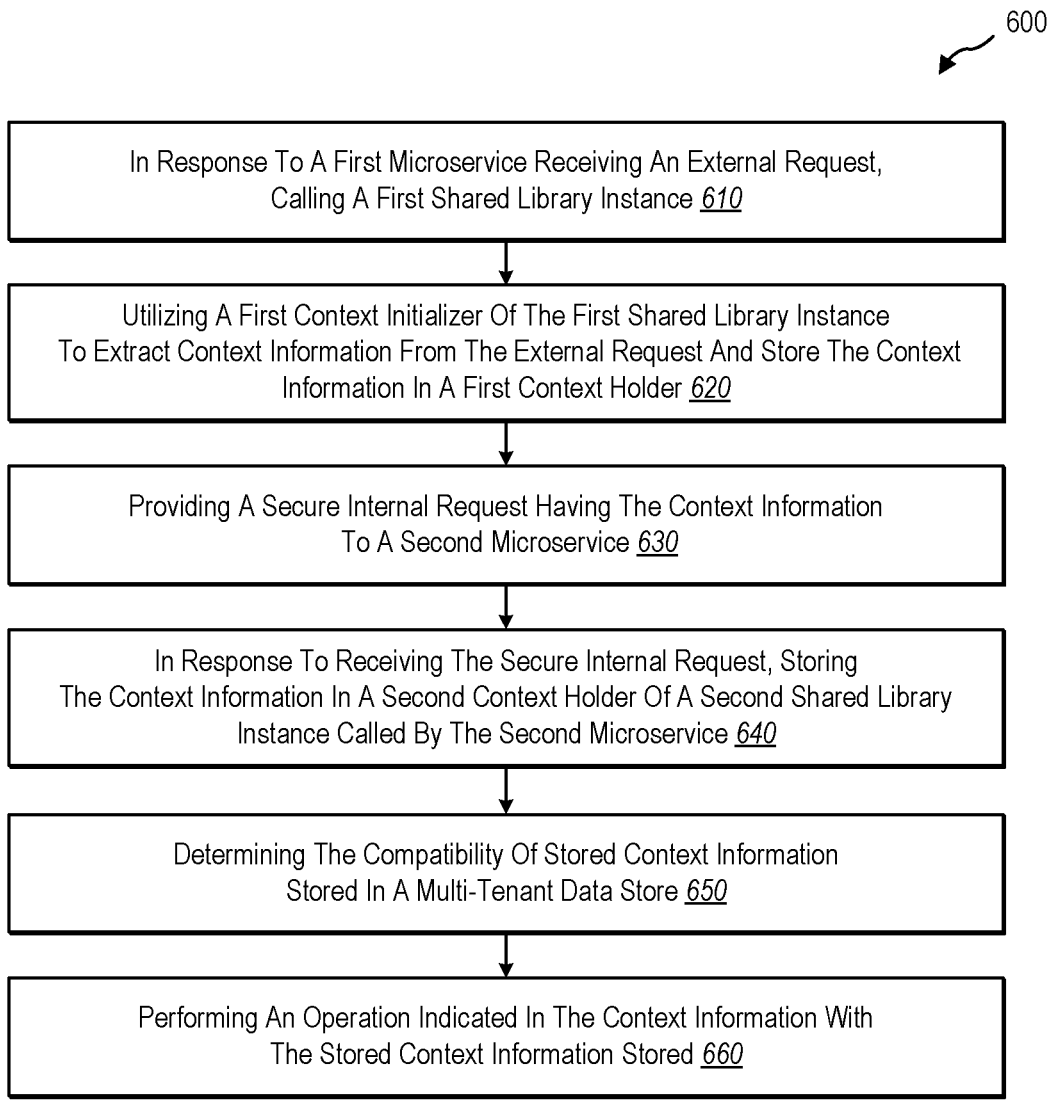
FIGS. 6-7 illustrate example series of computer-implemented methods for providing end-to-end context isolation across microservices in a multi-tenant distributed cloud system.
Figure 7:
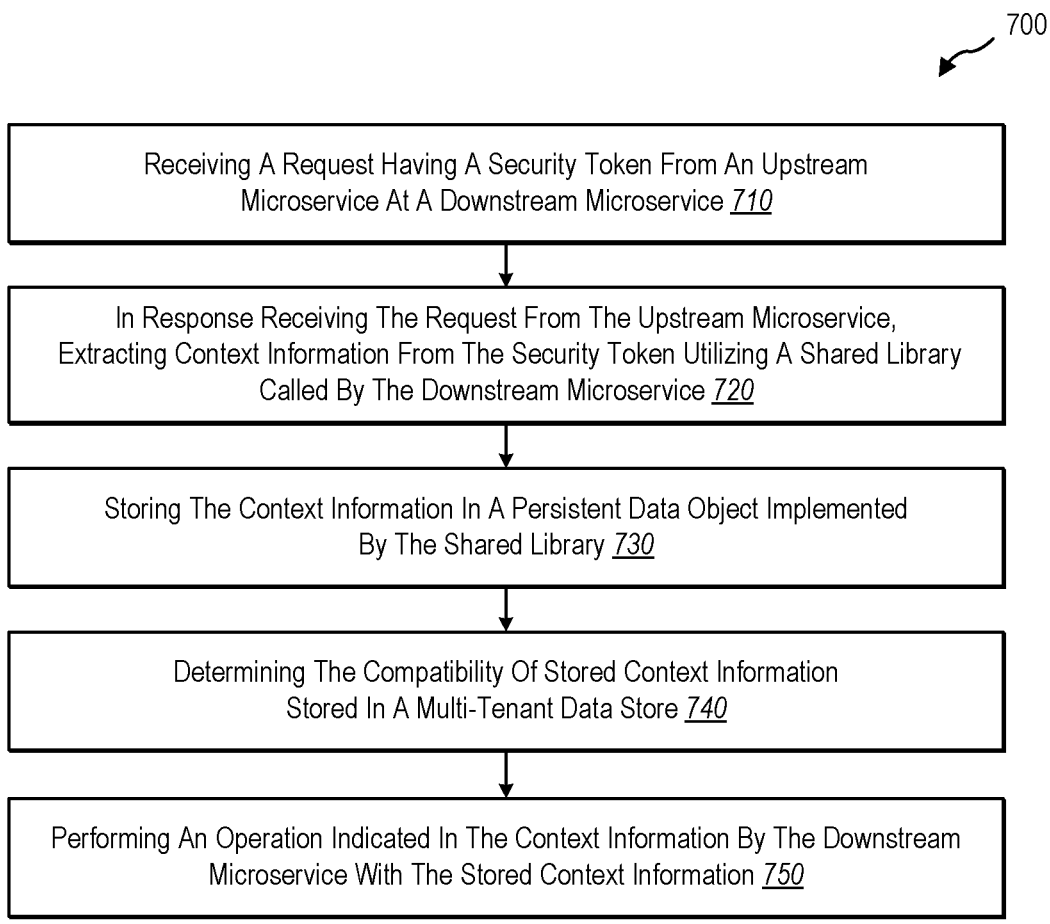

Turning now to FIG. 6 and FIG. 7, each of these figures illustrate an example flowchart that includes a series of acts for utilizing the context enforcement system according to one or more implementations. In particular, FIG. 6 and FIG. 7 illustrate example series of acts of computer-implemented methods for providing end-to-end context isolation across microservices in a multi-tenant distributed cloud system according to one or more implementations.

While FIG. 6 and FIG. 7 each illustrates acts according to one or more implementations, alternative implementations may omit, add to, reorder, and/or modify any of the acts shown. Further, the acts of FIG. 6 and FIG. 7 can be performed as part of a method such as a computer-implemented method. Alternatively, a non-transitory computer-readable medium can include instructions that, when executed by a processing system comprising a processor, cause a computing device to perform the acts of FIG. 6 and FIG. 7. In still further implementations, a system can perform (e.g., a processing system with a processor can cause instructions to be performed) the acts of FIG. 6 and FIG. 7.

As shown, the series of acts 600 includes an act 610 of calling a first shared library instance in response to a first microservice receiving an external request. For example, the act 610 involves calling, by a first microservice, a first shared library instance in response to the first microservice receiving an external request from an external source, the external request having a security token that embeds context information associated with an entity.

As further shown, the series of acts 600 includes an act 620 of utilizing a first context initializer of the first shared library instance to extract context information from the external request and store the context information in a first context holder. For instance, in example implementations, the act 620 involves utilizing a first context initializer implemented by the first shared library instance to verify the security token and extract the context information from the security token, and storing the context information at or in a first context holder that is implemented by the first shared library instance and accessible to the first microservice.

In some implementations, the act 620 of verifying the security token includes authenticating an identity from the security token as the entity and/or authorizing permission to perform the operation included in the context information. In various implementations, the act 620 includes storing the context information in a persistent data object within the first context holder. In various implementations, the context information includes a tenant identifier (tenant ID) or user identifier of the entity associated with the external source.

As further shown, the series of acts 600 includes an act 630 of providing a secure internal request having the context information to a second microservice. For instance, in example implementations, the act 630 involves providing, to a second microservice, an internal request generated by a context deliverer implemented by the first shared library instance that embeds the context information obtained from the first context holder with a new security token. In one or more implementations, the act 630 includes determining, by the first microservice and based on the context information, to provide the context information to the second microservice.

As further shown, the series of acts 600 includes an act 640 of storing the context information in a second context holder of a second shared library instance called by the second microservice in response to receiving the secure internal request. For instance, in example implementations, the act 640 involves calling, in response to receiving the internal request, a second shared library instance by the second microservice to extract the context information from the new security token and store the context information in a second context holder implemented by the second shared library instance, wherein the second context holder is separate from the first context holder.

In some implementations, the external request fails verification with a second context initializer implemented by the second shared library instance. In various implementations, in connection with the act 640, a second context initializer extracts the context information from the new security token, the new security token differs from the security token, the new security token includes a copy of the context information, and/or the new security token is authenticated based on the first microservice originating the internal request.

As further shown, the series of acts 600 includes an act 650 of determining the compatibility of stored context information stored in a multi-tenant data store. For instance, in example implementations, the act 650 involves determining, by a context enforcer implemented by the second shared library instance, the compatibility of stored context information stored in a multi-tenant data store identified based on the context information from the second context holder.

In one or more implementations, the act 650 includes comparing, by a context enforcer implemented by the second shared library instance, the context information from the second context holder using stored context information stored in a multi-tenant data store to determine compatibility. In some implementations, the act 650 includes the context enforcer determining compatibility by comparing an identifier of the context information from the second context holder to a stored identifier of the stored context information to determine a match. In various implementations, the act 650 includes determining, by the shared library, the compatibility of stored context information stored in a multi-tenant data store by comparing the context information from the persistent data object.

In various implementations, the act 650 includes the context enforcer determining compatibility by comparing a portion of the context information from the second context holder to a data type from the stored context information to determine whether the portion of the context information is compatible with the data type. In one or more implementations, the act 650 includes the context enforcer determining compatibility by matching a target value of the context information from the second context holder to a corresponding target value of the stored context information.

As further shown, the series of acts 600 includes an act 660 of performing an operation indicated in the context information with the stored context information stored. For instance, in example implementations, the act 660 involves performing, by the second microservice, an operation indicated in the context information with the stored context information stored in the multi-tenant data store based on the context information from the second context holder being compatible with the stored context information. In one or more implementations, the act 660 includes determining, by the second microservice and from the context information, to perform the operation between the context information from the second context holder and the stored context information stored in the multi-tenant data store.

In various implementations, the first context holder provides read-only access permission to the first microservice when the first microservice accesses the context information stored in the first context holder. In some implementations, the first shared library instance called by the first microservice operates independently of the second shared library instance called by the second microservice.

In some implementations, the series of acts 600 includes additional acts. For example, the series of acts 600 includes acts of receiving additional context information at the first microservice and utilizing the first shared library instance to securely provide a copy of the additional context information to the second microservice via an additional internal request having an additional new security token; and storing, at the second microservice utilizing the second shared library instance, the additional context information in the second context holder. Additionally, in various implementations, the series of acts 600 includes an act of rejecting, by the second microservice, an additional operation indicated in the additional context information based on determining that the additional context information from the second context holder is not compatible with additional stored context information stored in the multi-tenant data store. In some implementations, the series of acts 600 includes an act of removing, by the second microservice, data from the additional context information stored at the second context holder based on determining that the data from the additional context information from the second context holder is not compatible with additional stored context information stored in the multi-tenant data store.

Turning to FIG. 7, as shown, the series of acts 700 includes an act 710 of receiving a request having a security token from an upstream microservice at a downstream microservice. For example, the act 710 involves receiving a request having a security token from an upstream microservice at a downstream microservice within a multi-tenant distributed cloud system. In various implementations, the downstream microservice is an internal microservice not accessible by external sources.

As further shown, the series of acts 700 includes an act 720 of extracting context information from the security token utilizing a shared library called by the downstream microservice in response to receiving the request from the upstream microservice. For instance, in example implementations, the act 720 involves extracting, in response to a downstream microservice receiving a request having a security token from an upstream microservice, context information from the security token utilizing a shared library called by the downstream microservice, wherein the shared library authenticates and authorizes the security token upon receiving the request.

As further shown, the series of acts 700 includes an act 730 of storing the context information in a persistent data object implemented by the shared library. For instance, in example implementations, the act 730 involves storing the context information in a persistent data object implemented by the shared library.

As further shown, the series of acts 700 includes an act 740 of determining the compatibility of stored context information stored in a multi-tenant data store. For instance, in example implementations, the act 740 involves determining, by the shared library, the compatibility of stored context information stored in a multi-tenant data store by comparing the context information from the persistent data object. In some implementations, the act 740 includes comparing, by the shared library, the context information from the persistent data object with stored context information stored in a multi-tenant data store to determine compatibility.

As further shown, the series of acts 700 includes an act 750 of performing an operation indicated in the context information by the downstream microservice with the stored context information. For instance, in example implementations, the act 750 involves performing, based on the context information from the persistent data object being compatible with the stored context information and by the downstream microservice, an operation indicated in the context information with the stored context information stored in the multi-tenant data store. In various implementations, the multi-tenant data store is external to the multi-tenant distributed cloud system. In some implementations, the multi-tenant data store is part of the multi-tenant distributed cloud system. In one or more implementations, the multi-tenant data store includes data entries from multiple tenants serviced by the multi-tenant distributed cloud system.

Figure 8:
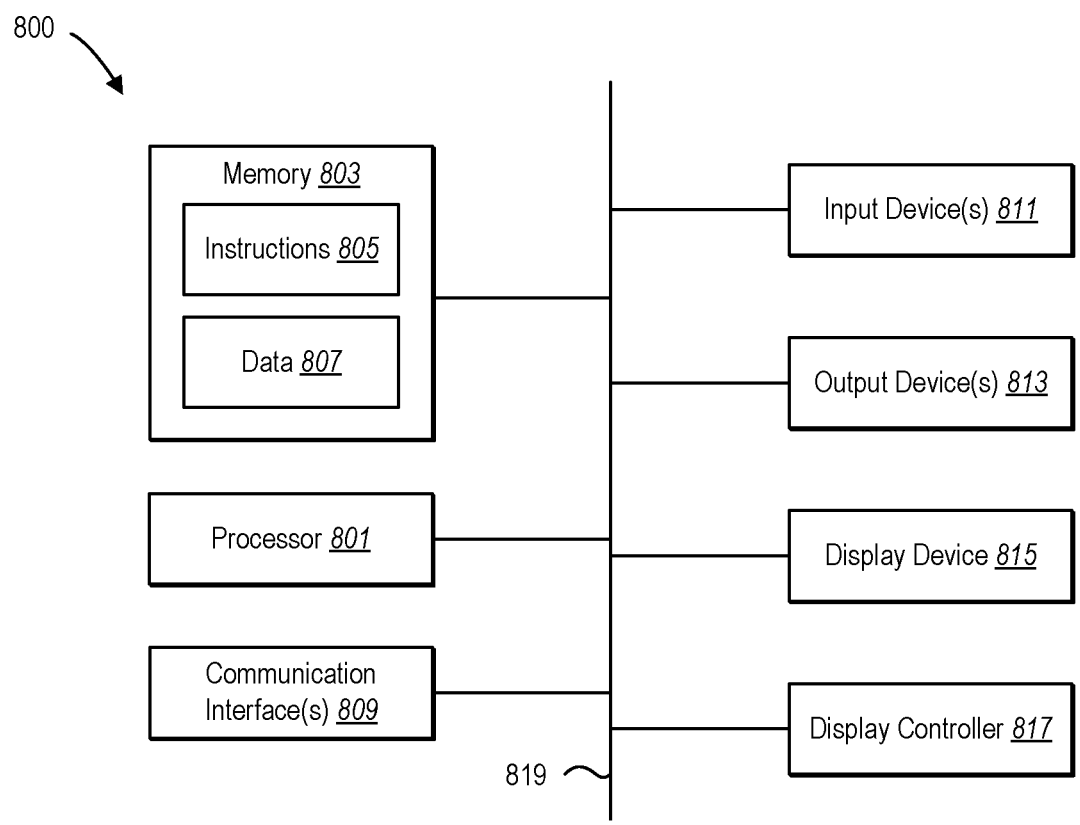
FIG. 8 illustrates example components included within a computer system on which the context enforcement system may be implemented.

FIG. 8 illustrates certain components that may be included within a computer system 800. The computer system 800 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 800 represents one or more of the client devices, server devices, or other computing devices described in this disclosure. For example, the computer system 800 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 800 includes a processing system including a processor 801. The processor 801 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 801 may be referred to as a central processing unit (CPU) and may cause computer-implemented instructions to be performed. Although the processor 801 shown is just a single processor in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 805 and the data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during the execution of the instructions 805 by the processor 801.

A computer system 800 may also include one or more communication interface(s) 809 for communicating with other electronic devices. The one or more communication interface(s) 809 may be based on wired communication technology, wireless communication technology, or both.

Some examples of the one or more communication interface(s) 809 include a Universal Serial Bus (USB), an Ethernet adapter, a wireless adapter that operates according to an Institute of Electrical and Electronics Engineers (IEEE) 802.11 wireless communication protocol, a Bluetooth® wireless communication adapter, and an infrared (IR) communication port.

A computer system 800 may also include one or more input device(s) 811 and one or more output device(s) 813. Some examples of the one or more input device(s) 811 include a keyboard, mouse, microphone, remote control device, button, joystick, trackball, touchpad, and light pen. Some examples of the one or more output device(s) 813 include a speaker and a printer. A specific type of output device that is typically included in a computer system 800 is a display device 815. The display device 815 used with implementations disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For clarity, the various buses are illustrated in FIG. 8 as a bus system 819.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described in this disclosure. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for providing end-to-end context isolation across microservices in a multi-tenant distributed cloud system comprising:

calling, by a first microservice, a first shared library instance in response to the first microservice receiving an external request from an external source, the external request having a security token that embeds context information associated with an entity;

utilizing a first context initializer implemented by the first shared library instance to verify the security token and extract the context information from the security token;

storing the context information in a first context holder that is implemented by the first shared library instance and accessible to the first microservice;

providing, to a second microservice, an internal request generated by a context deliverer implemented by the first shared library instance that embeds the context information obtained from the first context holder with a new security token;

in response to receiving the internal request, calling a second shared library instance by the second microservice to extract the context information from the new security token and store the context information in a second context holder implemented by the second shared library instance, wherein the second context holder is separate from the first context holder;

determining, by a context enforcer implemented by the second shared library instance, compatibility of stored context information stored in a multi-tenant data store identified based on the context information from the second context holder; and based on the context information from the second context holder being compatible with the stored context information, performing, by the second microservice, an operation indicated in the context information with the stored context information stored in the multi-tenant data store.

2. The computer-implemented method of claim 1, wherein the first shared library instance called by the first microservice operates independently of the second shared library instance called by the second microservice.

3. The computer-implemented method of claim 1, further comprising determining, by the second microservice and from the context information, to perform the operation between the context information from the second context holder and the stored context information stored in the multi-tenant data store.

4. The computer-implemented method of claim 1, wherein the context enforcer determines compatibility by comparing an identifier of the context information from the second context holder to a stored identifier of the stored context information to determine a match.

5. The computer-implemented method of claim 1, wherein the context enforcer determines compatibility by comparing a portion of the context information from the second context holder to a data type from the stored context information to determine that the portion of the context information is compatible with the data type.

6. The computer-implemented method of claim 1, wherein the context enforcer determines compatibility by matching a target value of the context information from the second context holder to a corresponding target value of the stored context information.

7. The computer-implemented method of claim 1, wherein the context information is stored in a persistent data object within the first context holder.

8. The computer-implemented method of claim 1, wherein the context information includes a tenant identifier of the entity associated with the external source.

9. The computer-implemented method of claim 1, wherein verifying the security token includes:
   authenticating an identity from the security token as the entity; and
   authorizing permission to perform the operation included in the context information.

10. The computer-implemented method of claim 1, wherein the external request fails verification with a second context initializer implemented by the second shared library instance.

11. The computer-implemented method of claim 1, further comprising determining, by the first microservice and based on the context information, to provide the context information to the second microservice.

12. The computer-implemented method of claim 1, wherein the first context holder provides read-only access permission to the first microservice when the first microservice accesses the context information stored in the first context holder.

13. The computer-implemented method of claim 1, wherein:
   a second context initializer extracts the context information from the new security token;
   the new security token differs from the security token;
   the new security token includes a copy of the context information; and
   the new security token is authenticated based on the first microservice originating the internal request.

14. The computer-implemented method of claim 1, further comprising:
   receiving additional context information at the first microservice and utilizing the first shared library instance to securely provide a copy of the additional context information to the second microservice via an additional internal request having an additional new security token; and
   storing, at the second microservice utilizing the second shared library instance, the additional context information in the second context holder.

15. The computer-implemented method of claim 14, further comprising:
   rejecting, by the second microservice, an additional operation indicated in the additional context information based on determining that the additional context information from the second context holder is not compatible with additional stored context information stored in the multi-tenant data store; or
   removing, by the second microservice, data from the additional context information stored at the second context holder based on determining that the data from the additional context information from the second context holder is not compatible with additional stored context information stored in the multi-tenant data store.

16. A computer-implemented method for providing end-to-end context isolation across microservices in a multi-tenant distributed cloud system comprising:
   in response to a downstream microservice receiving a request having a security token from an upstream microservice, extracting context information from the security token utilizing a shared library called by the downstream microservice, wherein the shared library authenticates and authorizes the security token upon receiving the request;
   storing the context information in a persistent data object implemented by the shared library;
   determining, by the shared library, compatibility of stored context information stored in a multi-tenant data store by comparing the context information from the persistent data object; and
   based on the context information from the persistent data object being compatible with the stored context information, performing, by the downstream microservice, an operation indicated in the context information with the stored context information stored in the multi-tenant data store.

17. The computer-implemented method of claim 16, wherein the multi-tenant data store is external to the multi-tenant distributed cloud system.

18. The computer-implemented method of claim 16, wherein the multi-tenant data store includes data entries from multiple tenants serviced by the multi-tenant distributed cloud system.

19. A system for providing end-to-end context isolation across microservices in a multi-tenant distributed cloud system, the system comprising:
   a processing system having a processor; and
   a computer memory including instructions that, when executed by the processing system, cause the system to carry out operations comprising:
      in response to a downstream microservice receiving a request having a security token from an upstream microservice, extracting context information from the security token utilizing a shared library called by the downstream microservice, wherein the shared library authenticates and authorizes the security token upon receiving the request;
      storing the context information in a persistent data object implemented by the shared library;

determining, by the shared library, compatibility of stored context information stored in a multi-tenant data store by comparing the context information from the persistent data object; and based on the context information from the persistent data object being compatible with the stored context information, performing, by the downstream microservice, an operation indicated in the context information with the stored context information stored in the multi-tenant data store.

20. The system of claim 19, wherein the multi-tenant data store includes data entries from multiple tenants serviced by the multi-tenant distributed cloud system.

\* \* \* \* \*